US012090696B2

(12) United States Patent
Park et al.

(10) Patent No.: US 12,090,696 B2
(45) Date of Patent: Sep. 17, 2024

(54) COOLING MODULE WITH MICROPOROUS COOLING STRUCTURE APPLIED THERETO AND METHOD OF LOCALLY COOLING MOLD USING THE SAME

(71) Applicant: Foundation for Research and Business, Seoul National University of Science and Technology, Seoul (KR)

(72) Inventors: Keun Park, Seoul (KR); Junwon Lee, Seoul (KR)

(73) Assignee: FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/963,117

(22) Filed: Oct. 10, 2022

(65) Prior Publication Data

US 2023/0111054 A1   Apr. 13, 2023

(30) Foreign Application Priority Data

Oct. 8, 2021   (KR) .................. 10-2021-0133653

(51) Int. Cl.
*B29C 45/73* (2006.01)
*B29C 45/40* (2006.01)
*B33Y 80/00* (2015.01)

(52) U.S. Cl.
CPC ............ *B29C 45/73* (2013.01); *B29C 45/401* (2013.01); *B33Y 80/00* (2014.12)

(58) Field of Classification Search
CPC . B29C 45/72–73; B29C 45/26; B29C 45/263; B29C 45/2642; B29C 45/401
See application file for complete search history.

(56) References Cited

U.S. PATENT DOCUMENTS

| 2013/0220571 | A1  | 8/2013 | Rocco et al. |
| 2018/0015532 | A1* | 1/2018 | Cendrowicz ............. B22C 9/10 |
| 2019/0111590 | A1* | 4/2019 | Trivedi ............... B29C 33/3835 |

(Continued)

FOREIGN PATENT DOCUMENTS

| KR | 10-2003-0011666 A | 2/2003 |
| KR | 10-1554491 B1    | 9/2015 |
| KR | 10-2018-0079499 A | 7/2018 |

(Continued)

*Primary Examiner* — Nahida Sultana
(74) *Attorney, Agent, or Firm* — NKL LAW; Jae Youn Kim

(57) ABSTRACT

Provided is a cooling module to which a microporous cooling structure is applied, and a method of locally and conformally cooling a mold using the same. The cooling module to which a microporous cooling structure is applied which is installed at each high temperature region inside a mold core and allows supplied cooling fluid to flow thereinto to perform local and conformal cooling on a mold may include a body part inserted into the mold core, a microporous cooling structure which is inserted into an upper portion of the body part and in which micro unit cells are periodically and repeatedly formed to form a plurality of connected hollow portions, and a cooling channel including a conduit configured to pass the cooling fluid through the microporous cooling structure.

7 Claims, 26 Drawing Sheets

(56) References Cited

U.S. PATENT DOCUMENTS

2020/0001510 A1* 1/2020 Wakabayashi ...... B29C 45/7312

FOREIGN PATENT DOCUMENTS

| KR | 10-1920157 B1 | 11/2018 |
| KR | 10-1923423 B1 | 11/2018 |
| KR | 10-2144447 B1 | 8/2020 |
| KR | 10-2243544 B1 | 4/2021 |

* cited by examiner

HXC

P surface

D surface

G surface

COOLING MODULE WITH MICROPOROUS COOLING STRUCTURE APPLIED THERETO AND METHOD OF LOCALLY COOLING MOLD USING THE SAME

CROSS-REFERENCE TO RELATED APPLICATION

This application claims priority to and the benefit of Korean Patent Application No. 10-2021-0133653 filed on Oct. 8, 2021, the disclosure of which is incorporated herein by reference in its entirety.

BACKGROUND

1. Field of the Invention

The present disclosure relates to a cooling module and a cooling method using the same, and particularly, to a cooling module to which a microporous cooling structure that is a structure in which micro unit cells are periodically repeatedly formed is applied, and a method of locally and conformally cooling a mold using the same.

2. Discussion of Related Art

An injection molding process is a typical production process for molding thermoplastic products, and is a molding method in which a liquid polymer resin plasticized at a high temperature is injected into a mold at a high speed and a high pressure, fills the mold, and is then cooled to produce a product.

Further, a die casting process is a casting process widely used to produce metal components having complex shapes, and is a casting method in which a metal material is melted at a high temperature, is injected into and fills a die at a high pressure, and is then cooled to produce a product.

Both the above-described injection molding and die casing processes have common characteristics in that a mold is used to manufacture a product and a material is melted at a high temperature, fills the mold, and is then cooled to solidify the product.

In this case, in the above molding methods, in general, to cool the mold, a cooling fluid circulates through a cooling channel formed inside the mold. In the related art, due to the ease of processing, a linear cooling channel 15a illustrated in FIG. 1A has been widely used.

However, when the linear cooling channel 15a is applied to a curved mold, it is difficult to uniformly cool a surface of the mold, and as a result, a cooling time is increased, and post-deformation of the product also occurs because the temperature of the molded product is non-uniform.

For this reason, with the recent development of the three-dimensional (3D) printing technology, a conformal cooling channel 15b that is difficult to be implemented using only machining according to the related art and is illustrated in FIG. 1B has been widely used. The conformal cooling channel 15b has cooling channels formed at regular intervals to be close to curved shapes of the surface of the mold, has the advantage that uniform and fast cooling is possible, and thus further improves cooling performance compared to the conventional method using the linear cooling channel 15a.

However, a metal 3D printing process used to produce the conformal cooling channel 15b is used limitedly in actual industrial sites due to high production costs. In particular, due to low surface roughness that is a disadvantage of the 3D printing process, additional post-processing is essential to use a 3D-printed (or additively manufactured) mold.

Further, in the case of a large mold, a long time and high cost are needed for producing an entire mold using the 3D printing, and thus a local and conformal cooling method capable of effectively intensively cooling only a required portion is needed.

SUMMARY OF THE INVENTION

The present disclosure is directed to providing a cooling module to which a microporous cooling structure is applied and which is, by applying the microporous cooling structure that is a structure in which micro unit cells are periodically and repeatedly formed, capable of improving cooling efficiency and performing local and conformal cooling, and a method of locally and conformally cooling a mold using the same.

According to an aspect of the present disclosure, there is provided a cooling module to which a microporous cooling structure is applied and which is installed at each high temperature region inside a mold core and moves supplied cooling fluid thereinto to perform local and conformal cooling on a mold, the cooling module including a body part inserted into the mold core, a microporous cooling structure which is inserted into an upper portion of the body part and in which micro unit cells are periodically and repeatedly formed to form a plurality of connected hollow portions, and a cooling channel including a conduit configured to pass the cooling fluid through the microporous cooling structure.

The microporous cooling structure may be formed to be separable from the mold core through the body part.

The body part and the microporous cooling structure may form a curved surface, which maintains a certain distance from a surface of the mold core facing a molded product, to perform conformal cooling.

The microporous cooling structure may be formed in a lattice form or a triply periodic minimal surface (TPMS) form.

The microporous cooing structure may adjust a cooling rate by changing a volume fraction of the hollow portion.

The microporous cooling structure may be produced by three-dimensional (3D) printing. The cooling module may further include an ejector pin insertion hole that allows an ejector pin to be inserted thereinto so as not to interfere with the ejector pin when the ejector pin is provided inside the mold.

The cooling module may further include a sealing member that is interposed between the body part and the mold core and prevents a leakage of the cooling fluid.

According to another aspect of the present disclosure, there is provided a method of locally and conformally cooling a mold using the cooling module to which the microporous cooling structure is applied, the method including a) forming an engraved insertion groove, into which the cooling module to which the microporous cooling structure is applied is to be inserted, at each local location of a mold core corresponding to a high-temperature portion of the mold, b) producing the cooling module into which a microlattice cooling structure is inserted, c) inserting the cooling module into each insertion groove, and d) cooling the high-temperature portion of the mold by moving cooling fluid through the microporous cooling structure.

The microporous cooing structure may adjust a cooling rate by changing a shape of a micro unit cell or a volume fraction of the hollow portion.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1A:
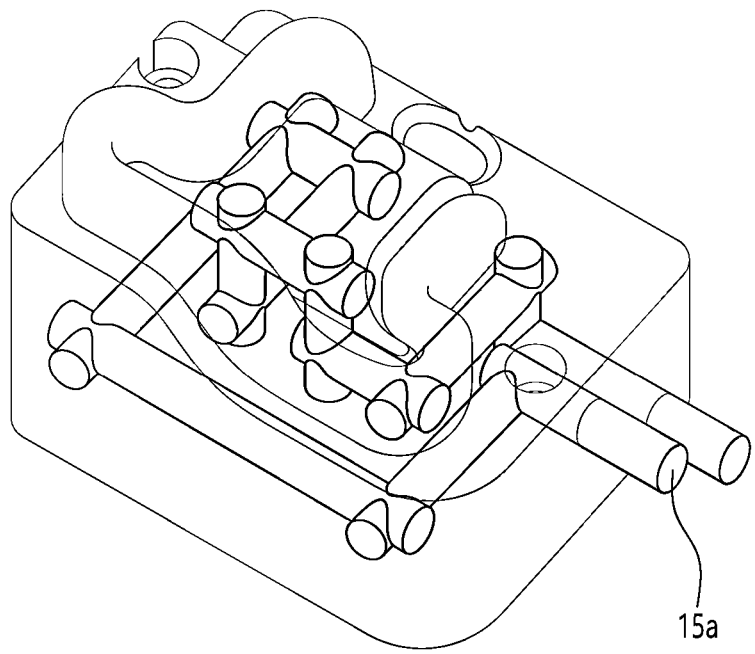
FIG. 1A is a view illustrating a straight cooing channel according to a related art, which is produced by machining.

Hereinafter, the description of the present disclosure with reference to the accompanying drawings is not limited to specific embodiments, various modifications may be made, and various embodiments may be provided. Further, it should be understood that the following description include all conversions, all equivalents, and all substitutes included in the spirit and scope of the present disclosure.

In the following description, terms such as first and second are terms used to describe various components, are not limited in their meaning, and are used only to distinguish one component from another component.

The same reference numerals used throughout the present specification refer to the same components.

Singular expressions used herein include plural expressions unless clearly otherwise indicated in the context. Further, it should be interpreted that terms such as "include" and "have" described below indicate that there are features, numbers, steps, operations, components, parts, or combinations thereof that are described in the specification, and it should be understood that the terms do not exclude in advance the possibility of the presence or addition of one or more other features, numbers, steps, operations, components, parts, or combinations thereof.

Hereinafter, embodiments of the present disclosure will be described in detail with reference to the accompanying drawings.

First, a cooling module according to an embodiment of the present disclosure is a cooling module (hereinafter, referred to as a "cooling module") which can improve cooling efficiency and to which a microporous cooling structure is applied, and is a cooling module which may be configured to perform conformal cooling inside a mold core, is installed at each high temperature region inside the mold core, locally and conformally cools only required parts throughout the mold core, and thus significantly improves cooling efficiency.

Figure 1B:
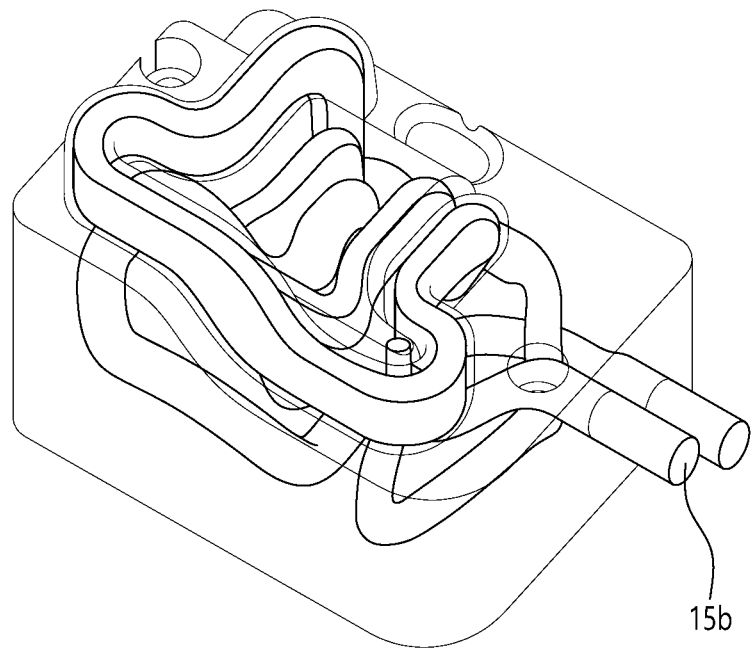
FIG. 1B is a view illustrating a conformal cooling channel according to a related art, which may be produced by three-dimensional (3D) printing.
Figure 2A:
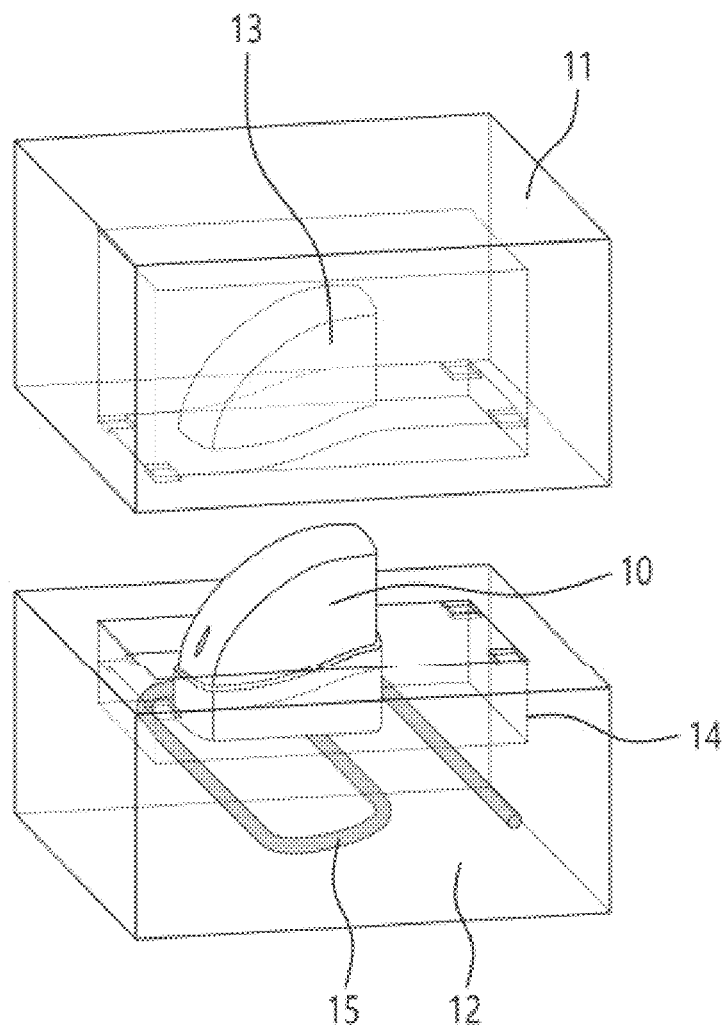
FIG. 2A is a view for describing a general structure of a mold.
Figure 2B:
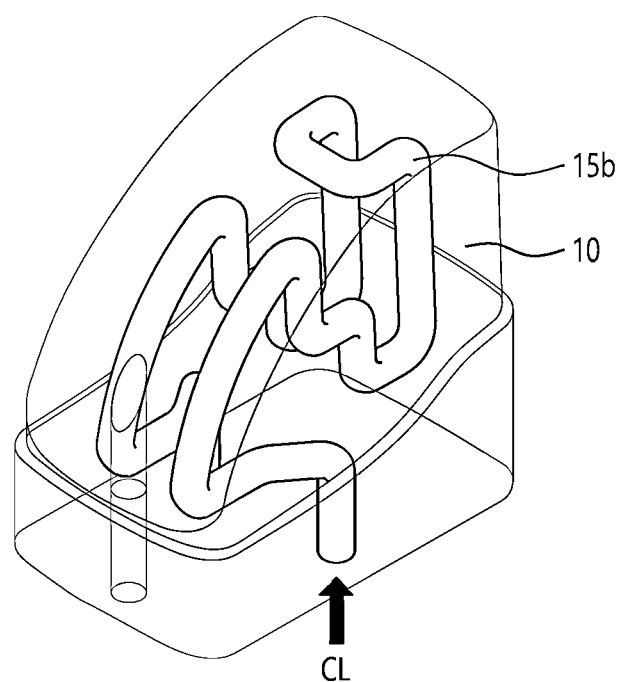
FIG. 2B is a view illustrating a state in which a conformal cooling channel according to a related art is integrally formed with a mold core illustrated in FIG. 2A.

FIG. 1A is a view illustrating a straight cooing channel according to a related art, which is produced by machining, FIG. 1B is a view illustrating a conformal cooling channel according to a related art, which may be produced by three-dimensional (3D) printing, FIG. 2A is a view for describing a general structure of a mold, and FIG. 2B is a view illustrating a state in which a conformal cooling channel according to a related art is integrally formed with a mold core illustrated in FIG. 2A.

Referring to FIGS. 1A to 2B, as illustrated in FIG. 2A, a mold core 10 is a unit which is generally mounted on a mold plate 14 provided in a lower mold and into which a cooling channel 15 through which cooling water CL flows is connected while determining, together with respective molds 11 and 12, a shape of a molded product molded in a cavity plate 13 provided between the upper mold 11 and the lower mold 12. In the mold core 10 according to the related art, a straight cooling channel 15a that is illustrated in FIG. 1A or a conformal cooling channel 15b that is illustrated in FIGS. 1B and 2B, is formed close to a curved shape of the molded product, and is also called a shape-adaptive cooling channel is provided to perform cooling.

However, the straight cooling channel 15a has the advantage that the straight cooling channel 15a is easily formed by machining (e.g., drilling) but has the disadvantages that, since it is difficult to uniformly cool a mold surface, a cooling time is increased, the temperature of the molded product is non-uniform, resulting in post-deformation of the product. The conformal cooling channel 15b is formed close to the curved shape of the molded product with the development of the 3D printing technology to be able to perform uniform and quick cooling but has a disadvantage in that post-processing is essential due to limited use in industrial sites caused by a high production cost of a metal 3D printing process and low surface quality.

A cooling module 100 according to an embodiment of the present disclosure is a cooling module that has improved cooling efficiency while supplementing the above-described problems of the linear cooling channel 15a or the conformal cooling channel 15b, and as will be described in detail below, a cooling time of the cooling module 100 is reduced by about two times or more compared to a cooling time of the conformal cooling channel 15b having better cooling efficiency than the linear cooling channel 15a.

Figure 3:
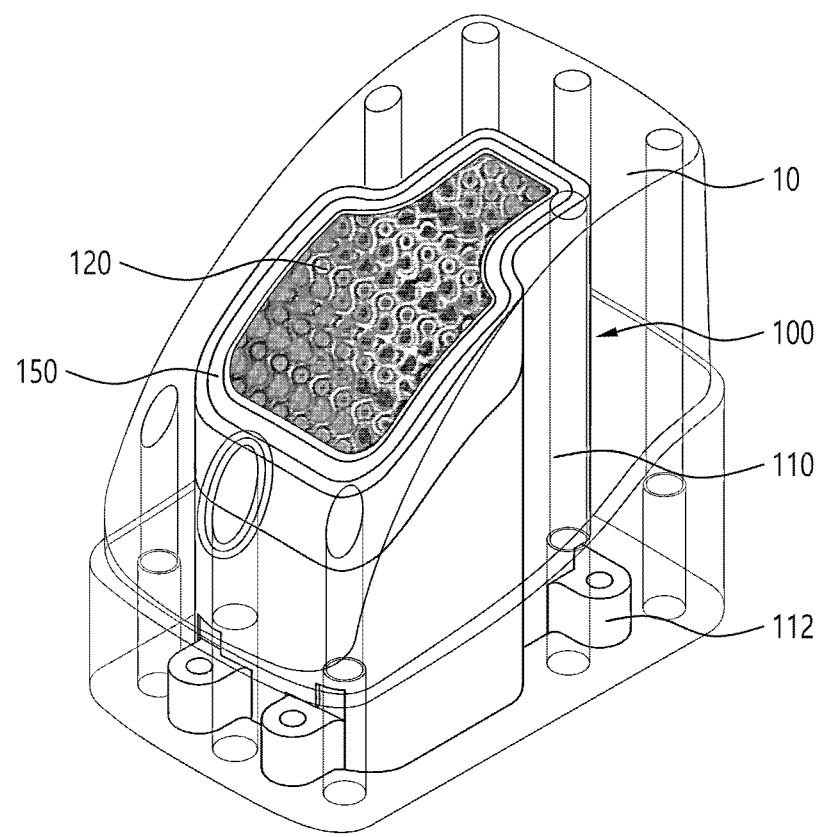
FIG. 3 is a perspective view illustrating a cooling module to which a microporous cooling structure according to an embodiment of the present disclosure, which is provided in the mold core, is applied.
Figure 4:
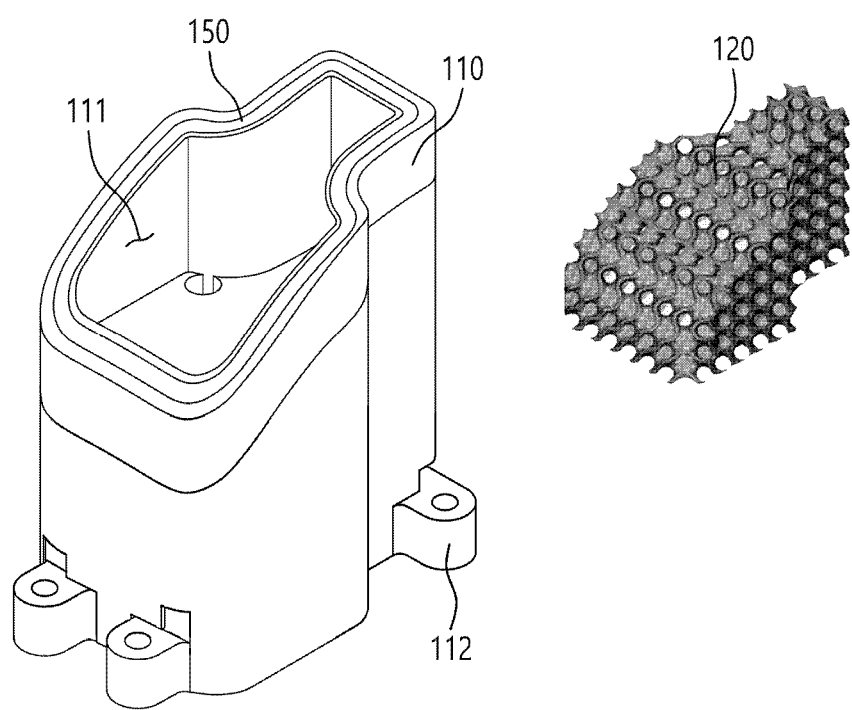
FIG. 4 is an exploded view of the cooling module to which the microporous cooling structure of FIG. 3 is applied.
Figure 5:
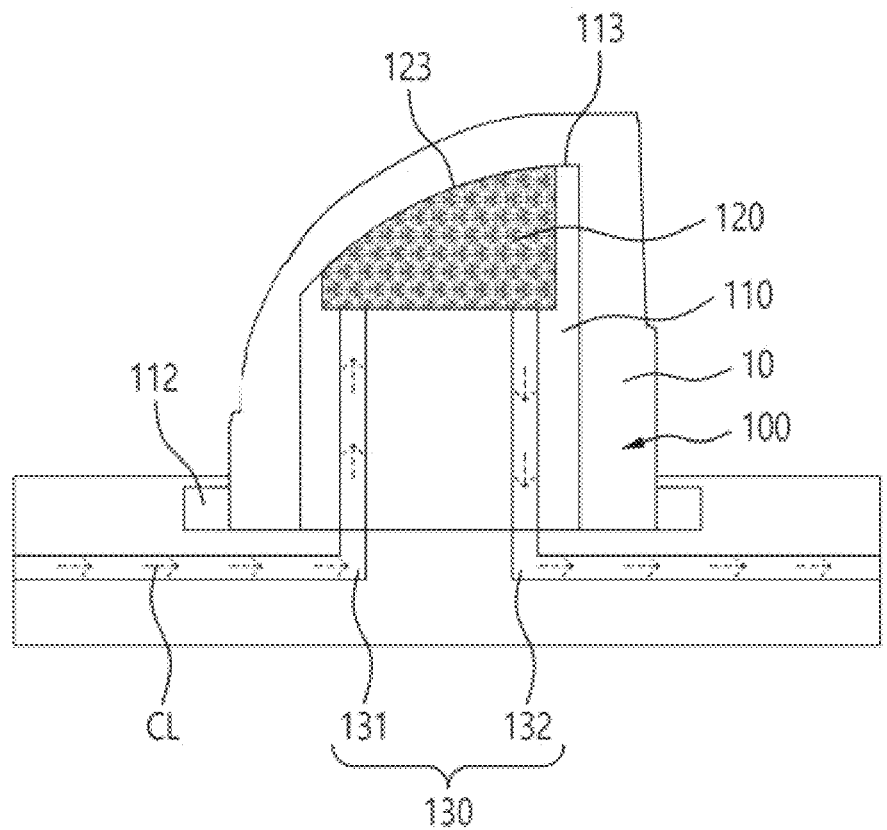
FIG. 5 is a side cross-sectional view of the cooling module to which the microporous cooling structure of FIG. 3 is applied.
Figure 6A:
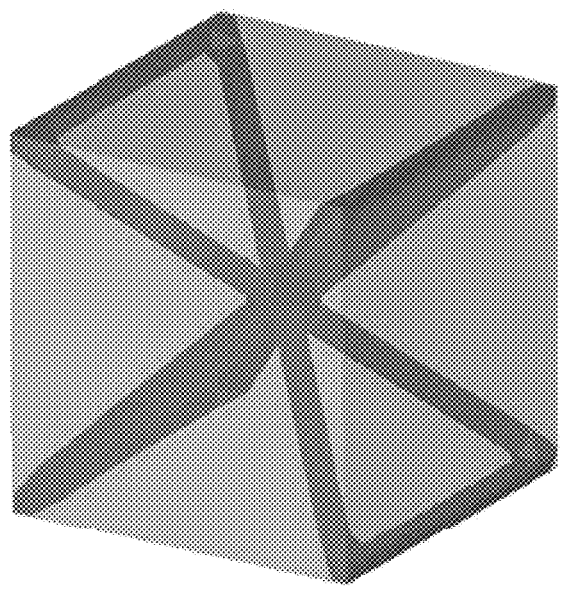
FIGS. 6A to 6D are views illustrating micro-cellular structures having a lattice form.
Figure 6B:
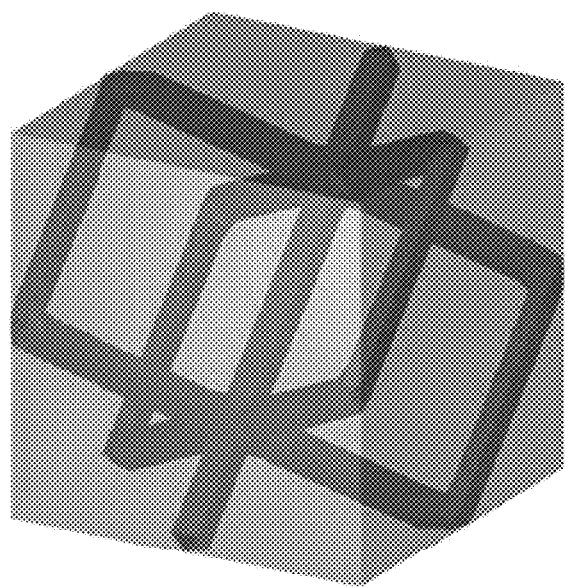
Figure 6C:
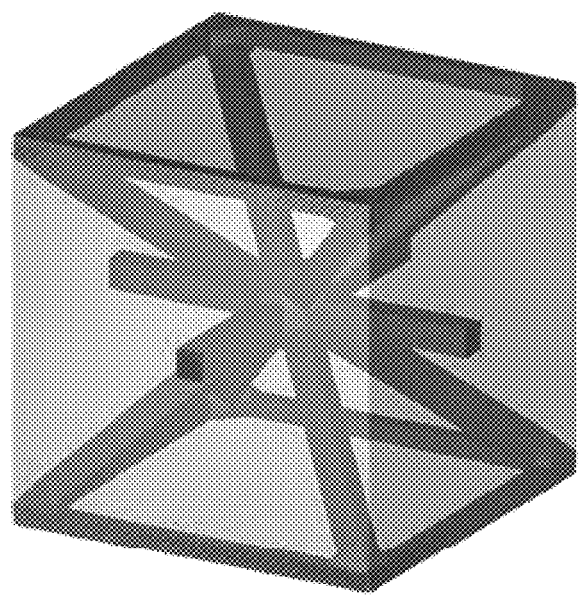
Figure 6D:
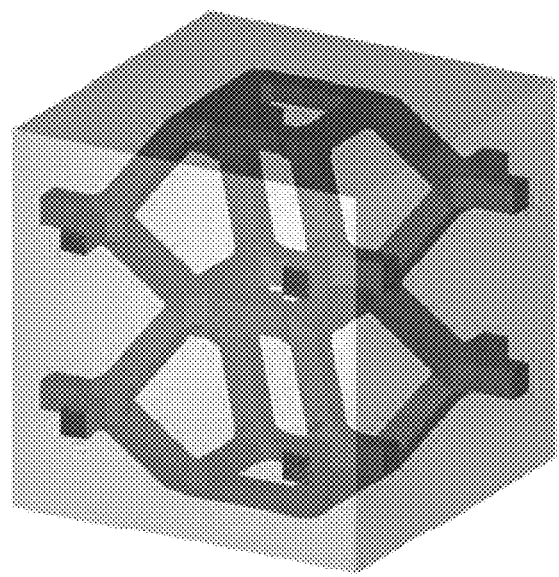

FIG. 3 is a perspective view illustrating a cooling module to which a microporous cooling structure according to an embodiment of the present disclosure, which is provided in the mold core, is applied, FIG. 4 is an exploded view of the cooling module to which the microporous cooling structure of FIG. 3 is applied, and FIG. 5 is a side cross-sectional view of the cooling module to which the microporous cooling structure of FIG. 3 is applied.

Figure 7A:
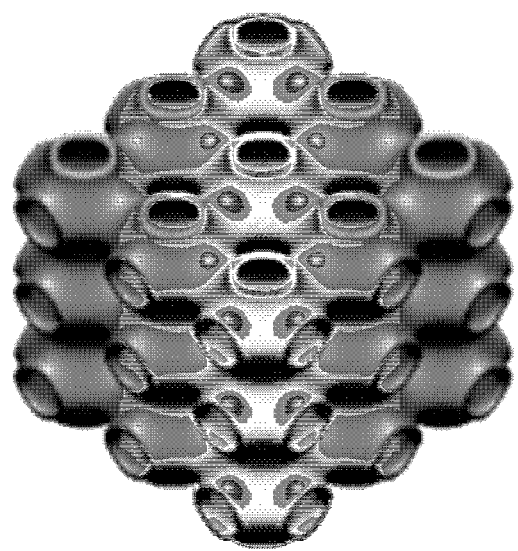
FIGS. 7A to 7C are views illustrating micro-cellular structures having a triply periodic minimal surface (TPMS) form.
Figure 7B:
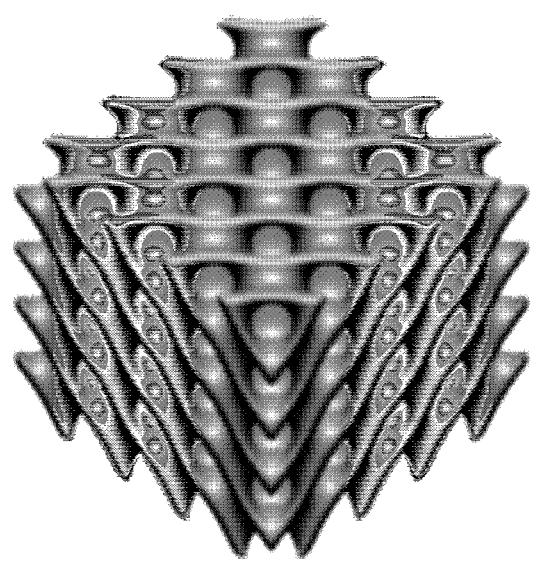
Figure 7C:
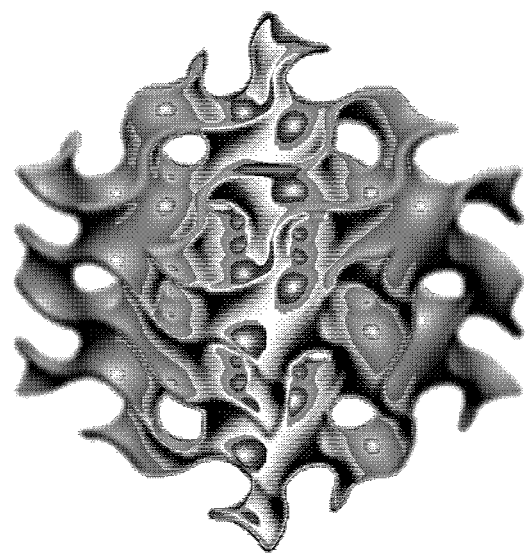

Further, FIGS. 6A to 6D are views illustrating microcellular structures having a lattice form, and FIGS. 7A to 7C are views illustrating micro-cellular structures having a triply periodic minimal surface (TPMS) form.

Figure 8A:
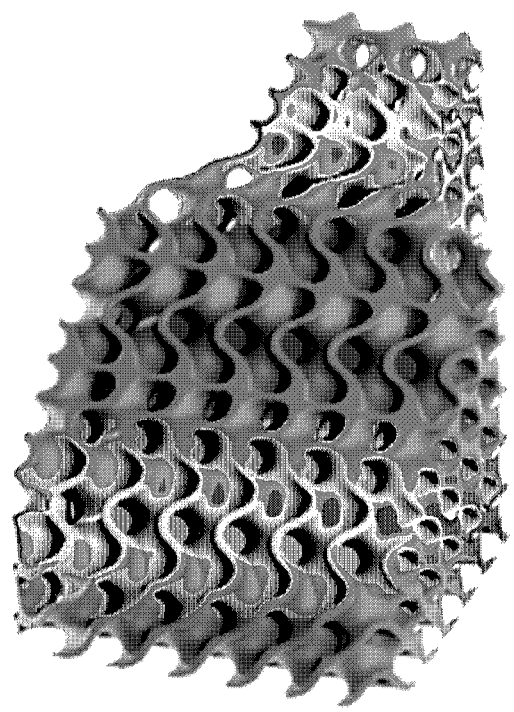
FIG. 8A is a view illustrating a volume fraction of 30% formed by adjusting a design variable when the size of a micro unit cell is 10 mm.
Figure 8B:
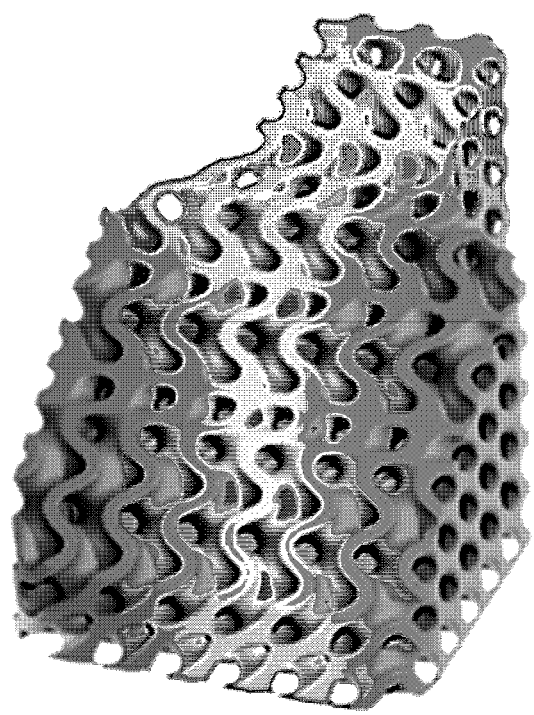
FIG. 8B is a view illustrating a volume fraction of 50% formed by adjusting the design variable when the size of the micro unit cell is 10 mm.
Figure 8C:
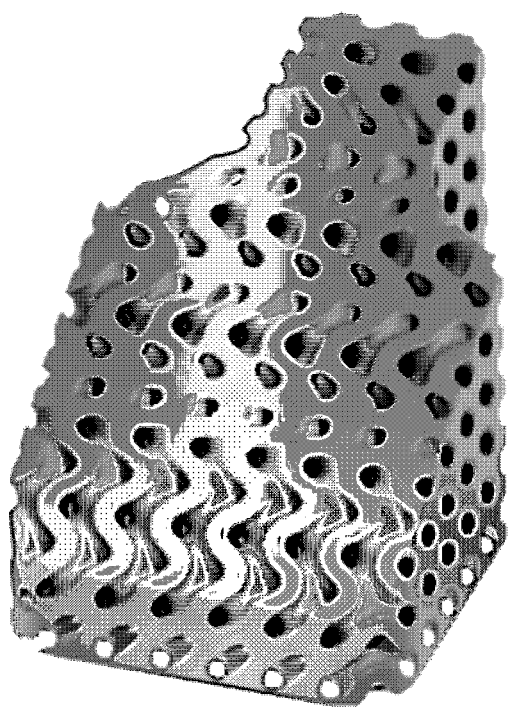
FIG. 8C is a view illustrating a volume fraction of 70% formed by adjusting the design variable when the size of the micro unit cell is 10 mm.

Further, FIG. 8A is a view illustrating a volume fraction of 30% formed by adjusting a design variable when the size of a micro unit cell is 10 mm, FIG. 8B is a view illustrating a volume fraction of 50% formed by adjusting the design variable when the size of the micro unit cell is 10 mm, and FIG. 8C is a view illustrating a volume fraction of 70% formed by adjusting the design variable when the size of the micro unit cell is 10 mm.

Figure 9A:
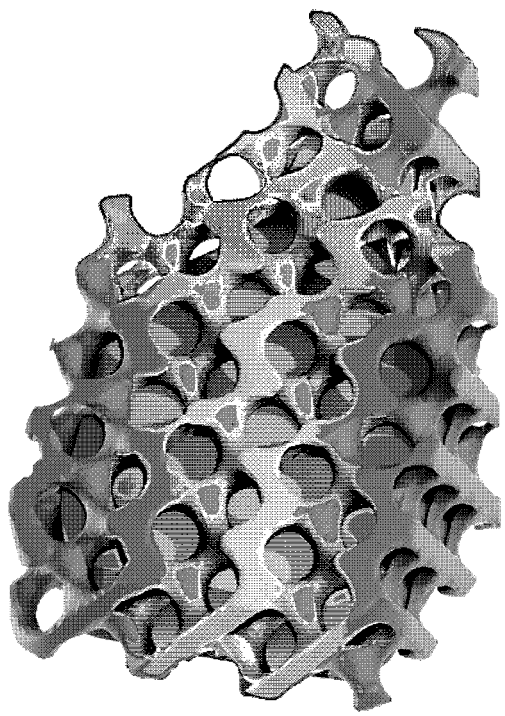
FIG. 9A is a view illustrating a volume fraction of 30% formed by adjusting a design variable when the size of a micro unit cell is 20 mm.
Figure 9B:
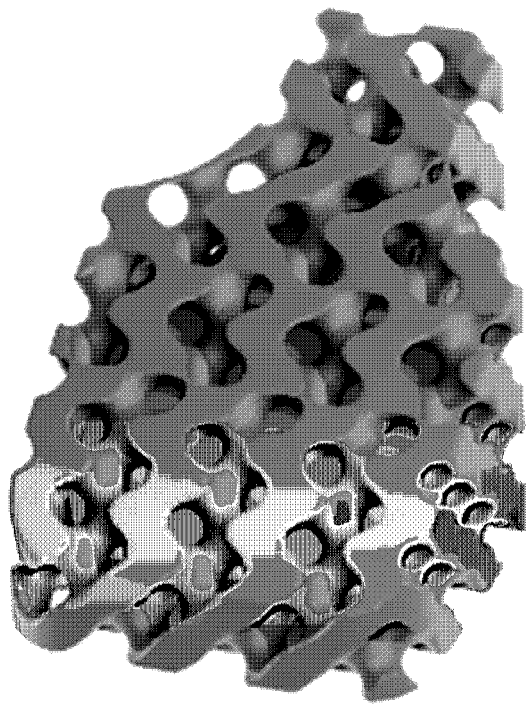
FIG. 9B is a view illustrating a volume fraction of 50% formed by adjusting the design variable when the size of the micro unit cell is 20 mm.
Figure 9C:
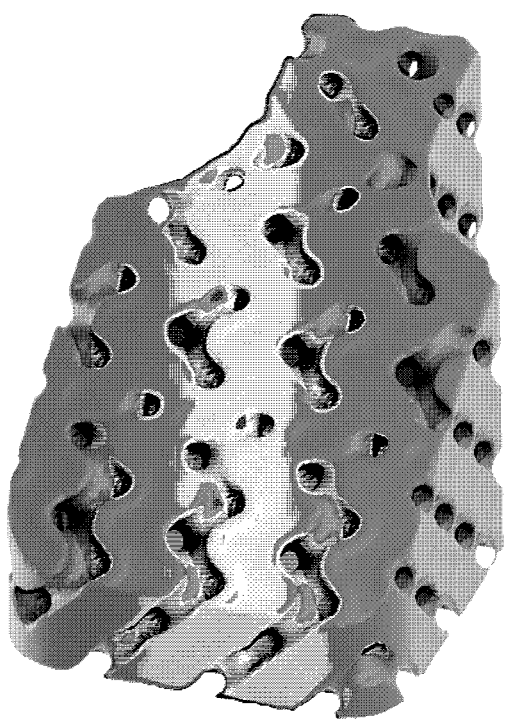
FIG. 9C is a view illustrating a volume fraction of 70% formed by adjusting the design variable when the size of the micro unit cell is 20 mm.

Further, FIG. 9A is a view illustrating a volume fraction of 30% formed by adjusting a design variable when the size of a micro unit cell is 20 mm, FIG. 9B is a view illustrating a volume fraction of 50% formed by adjusting the design variable when the size of the micro unit cell is 20 mm, and FIG. 9C is a view illustrating a volume fraction of 70% formed by adjusting the design variable when the size of the micro unit cell is 20 mm.

Figure 10:
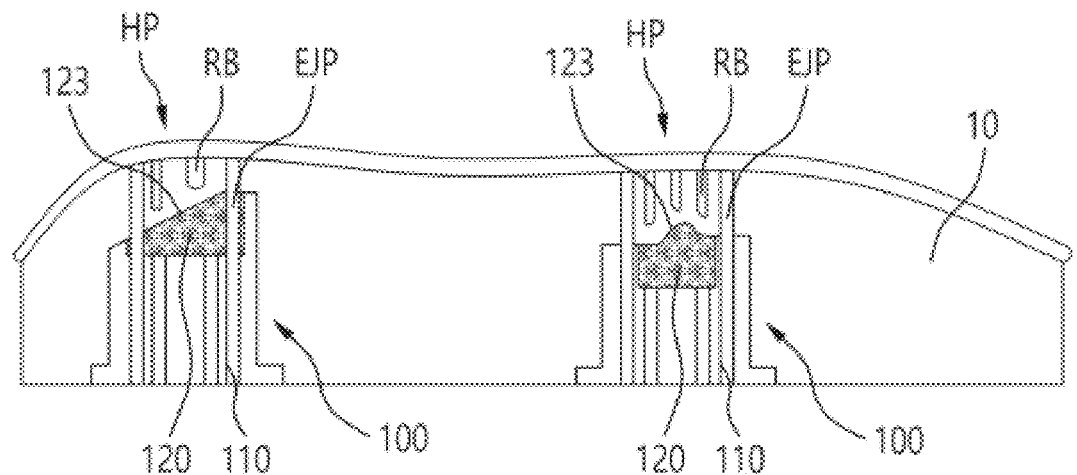
FIG. 10 is a view illustrating a state in which the cooling module to which the microporous cooling structure of FIG. 3 is applied is locally installed while avoiding interference of an ejector pin within the mold core.
Figure 11:
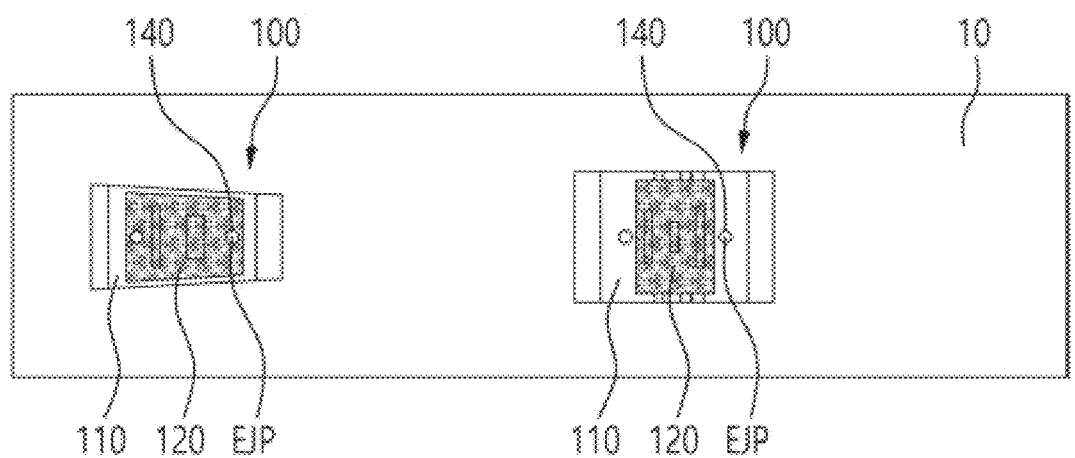
FIG. 11 is a sectional view when an upper portion of FIG. 10 is cut.

FIG. 10 is a view illustrating a state in which the cooling module to which the microporous cooling structure of FIG. 3 is applied is locally installed while avoiding interference of an ejector pin within the mold core, and FIG. 11 is a sectional view when an upper portion of FIG. 10 is cut.

Referring to FIGS. 3 to 11, the cooling module 100 according to an embodiment of the present disclosure as described above includes a body part 110, a microporous cooling structure 120, and a cooling channel 130 and may be configured to perform cooling inside the mold core 10.

In detail, the body part 110 may constitute a housing of the cooling module 100 and may be inserted into the mold core 10 in a state in which the microporous cooling structure 120 is inserted thereinto. Here, the body part 110 may be formed to form a single body with the mold core 10, but it is preferable that the body part 110 is formed to be separable from the mold core 10 and forms the microporous cooling structure 120, which will be described below, in a form separable from the mold core 10.

When the microporous cooling structure 120 is formed to be separable from the mold core 10, maintainability is improved and cooling efficiency is increased.

The body part 110 may include a structure insertion groove 111 for insertion of the microporous cooling structure 120, and it is preferable that the structure insertion groove 111 is provided above the body part 110. That is, an upper portion of the body part 110 may be recessed inward to form the structure insertion groove 111.

Here, the upper portion of the body part 110 is a portion opposite to the molded product with the mold core 10 interposed therebetween and is a portion closest to the molded product. The microporous cooling structure 120 inserted into the structure insertion groove 111 provided above the body part 110 may be located closest to the molded product inside the body part 110 to perform the cooling.

Further, the body part 110 may be provided with a fixing portion 112 to be assembled with the mold core 10. A location of the fixing portion 112 is not limited, but it is preferable that the fixing portion 112 is provided on a lower side that is a portion exposed to the outside when the body part 110 is inserted into the mold core 10. Fixing methods are not limited, and all methods such as fastening using a fastening bolt, fixing by inserting a pin, and a fixing using a magnetic force may be used as long as the methods easily perform assembling and disassembling.

Meanwhile, it is apparent that the mold core 10 forms a surface of a shape corresponding to a shape of the molded product to determine the shape of the molded product, and the body part 110 inserted into the mold core 10 may include a curved surface 113 formed on an upper surface thereof and maintaining a predetermined distance from a surface of the mold core 10.

This is for matching the curved surface 113 and a curved surface 123 of the microporous cooling structure when the curved surface 113 maintaining a predetermined distance from the surface of the mold core 10 facing the molded product is formed so that the microporous cooling structure 120, which will be described below, performs conformal cooling, and uniform heat conduction to the mold core 10 together with the microporous cooling structure 120 may be possible.

The microporous cooling structure 120 is a microcellular structure in which micro unit cells are periodically and repeatedly formed and includes a plurality of hollow portions, and all the hollow portions may be connected to each other.

In more detail, the microporous cooling structure 120 has the form of a lattice as illustrated in FIG. 6 or in the form of the TPMS form as illustrated in FIG. 7, and it is more preferable that the microporous cooling structure 120 has the form of the TPMS form.

As illustrated in FIGS. 6A to 6D, the form of the lattice may include a body-centered cubic (BCC) form, an edge-centered cubic (ECC) form, an octet-truss cubic (OTC) form, a hexagon cubic (HXC) form, or the like.

The TPMS form may include a P surface (here, P: cos (x)+cos (y)+cos (z)=0) as illustrated in FIG. 7A, a D surface (here, D: sin (x) sin (y) sin (z)+sin (x) cos (y) cos (z)+cos (x) sin (y) cos (z)+cos (x) cos (y) sin (z)=0) as illustrated in FIG. 7B, and a G surface (here, G: cos (x) sin (y)+cos (y) sin (z)+cos (z) sin (x)=0) as illustrated in FIG. 7C, and may include all forms as long as the forms are classified into a general TPMS form although not described herein.

As described above, the microporous cooling structure 120 may be inserted into the structure insertion groove 111 and located inside the mold core 10 through the body part 110, and when cooling fluid flows to the microporous cooling structure 120, the cooling fluid flows in a three-dimensional manner to the inside through the hollow portions connected to each other, and thus the mold can be cooled efficiently.

In this case, the microporous cooling structure 120 is effective for cooling when the size of the micro unit cells is 20 mm or less, but the present disclosure is not limited thereto, and the size may depart from the above-described range.

Further, the microporous cooling structure 120 may adjust a cooling rate while changing a volume fraction. In this case, the volume fraction of the hollow portions may be changed through a change in the size of the micro unit cell or a change in design variable (the diameter of a cylindrical part in the case of the lattice form, the thickness of the curved surface in the case of the TPMS form) of the micro unit cell.

In detail, FIG. 8A is a view illustrating a volume fraction of 30% formed by adjusting a design variable when the size of a micro unit cell is 10 mm, FIG. 8B is a view illustrating a volume fraction of 50% formed by adjusting the design variable when the size of the micro unit cell is 10 mm, FIG. 8C is a view illustrating a volume fraction of 70% formed by adjusting the design variable when the size of the micro unit cell is 10 mm, and FIGS. 8A to 8C illustrate a change in the volume fraction.

Further, FIG. 9A is a view illustrating a volume fraction of 30% formed by adjusting a design variable when the size of a micro unit cell is 20 mm, FIG. 9B is a view illustrating a volume fraction of 50% formed by adjusting the design variable when the size of the micro unit cell is 20 mm, FIG. 9C is a view illustrating a volume fraction of 70% formed by adjusting the design variable when the size of the micro unit cell is 20 mm, and FIGS. 9A to 9C illustrate the change in the volume fraction.

In this way, the volume fraction may be changed by adjusting the design variable while the micro unit cell is fixed to a certain size, and although not illustrated, the volume fraction may be changed through a change in the size, the shape, or the like of the micro unit cell as described above.

When the volume fraction is changed, the cooling efficiency may be changed by adjusting the amount of a fluid flowing along the hollow portions, and thus the cooling rate may be set as desired by adjusting the volume fraction.

Meanwhile, as described above in the description of the body part 110, the microporous cooling structure 120 may be formed in a form that is separable from the mold core 10 through the body part 110, thereby improving cooling efficiency and maintainability.

Further, the curved surface 123 maintaining a predetermined distance from the surface of the mold core 10 facing the molded product may be formed together with the body part 110. Accordingly, the conformal cooling can be performed on a cooling portion.

In addition, since the microporous cooling structure 120 has a complex shape, it is preferable that the microporous cooling structure 120 is manufactured using 3D printing, but the present disclosure is not necessarily limited thereto, and the microporous cooling structure 120 may be produced by machining or special processing.

The microporous cooling structure 120 may be inserted into the structure insertion groove 111 of the body part 110, located inside the mold core 10 through the body part 110, and receive the cooling fluid from the cooling channel 130 to cool the mold.

The cooling channel 130 may include a conduit configured to pass the cooling fluid through the microporous cooling structure 120. That is, the cooling channel 130 may include an inlet channel 131 through which the cooling fluid flows into the microporous cooling structure 120, and at the same time, may include an outlet channel 132 through which the cooling fluid performing a cooling operation is discharged from the microporous cooling structure 120.

In this case, the cooling channel 130 may be connected to a mold plate (not illustrated), but this is merely illustrative and not limitative, and the cooling channel 130 may be connected to another place and configured to receive the cooling fluid.

As illustrated in FIG. 10, the cooling module 100 may be installed close to each high temperature region inside the mold core 10, and thus can locally and conformally cool the mold. Accordingly, the cooling module 100 may be applied only to a necessary portion with low production costs without restrictions on the size of the mold even while the conformal cooling is effectively achieved.

Meanwhile, when there are many structures such as ribs RB inside the molded product, a mold temperature is generally high. Since ejector pins EJP are generally installed near the ribs RB, it is difficult to install the cooling channel or since the cooling channel should be installed while avoiding interference of the ejector pins, it is difficult to place the cooling channel close to a high-temperature portion including the ribs.

However, as illustrated in FIGS. 10 and 11, the cooling module 100 of the present disclosure further includes an ejector pin insertion hole 140, thereby avoid this problem. The ejector pin insertion hole 140 may be formed in a vertical direction of the body part 110 in consideration of a direction in which the ejector pins EJP are inserted, but this is illustrative and not limitative, and the formation direction may be changed.

The ejector pin EJP is inserted through the ejector pin insertion hole 140 so that interference between the ejector pin EJP and the cooling module 100 can be avoided. In this case, the ejector pin insertion hole 140 may be formed so that the ejector pin EJP passes through the body part 110 and the microporous cooling structure 120 or does not pass through the microporous cooling structure 120 and passes through only the body part 110.

The cooling module 100 of the present disclosure avoids interference with the ejector pin EJP using the ejector pin insertion hole 140, and thus may become closer to a high-temperature portion HP, and can effectively cool the high-temperature portion HP.

In addition, the cooling module 100 of the present disclosure may further include a sealing member 150 interposed between the body part 110 and the mold core 10. Here, a material of the sealing member 150 is not limited, but it is preferable that the material is an elastomer material such as rubber or silicone, and the sealing member 150 can prevent the cooling fluid from leaking between the body part 110 and the mold core 10.

Hereinafter, referring to FIG. 12, a method of locally and conformally cooling a mold using the cooling module to which the microporous cooling structure is applied will be described briefly.

Figure 12:
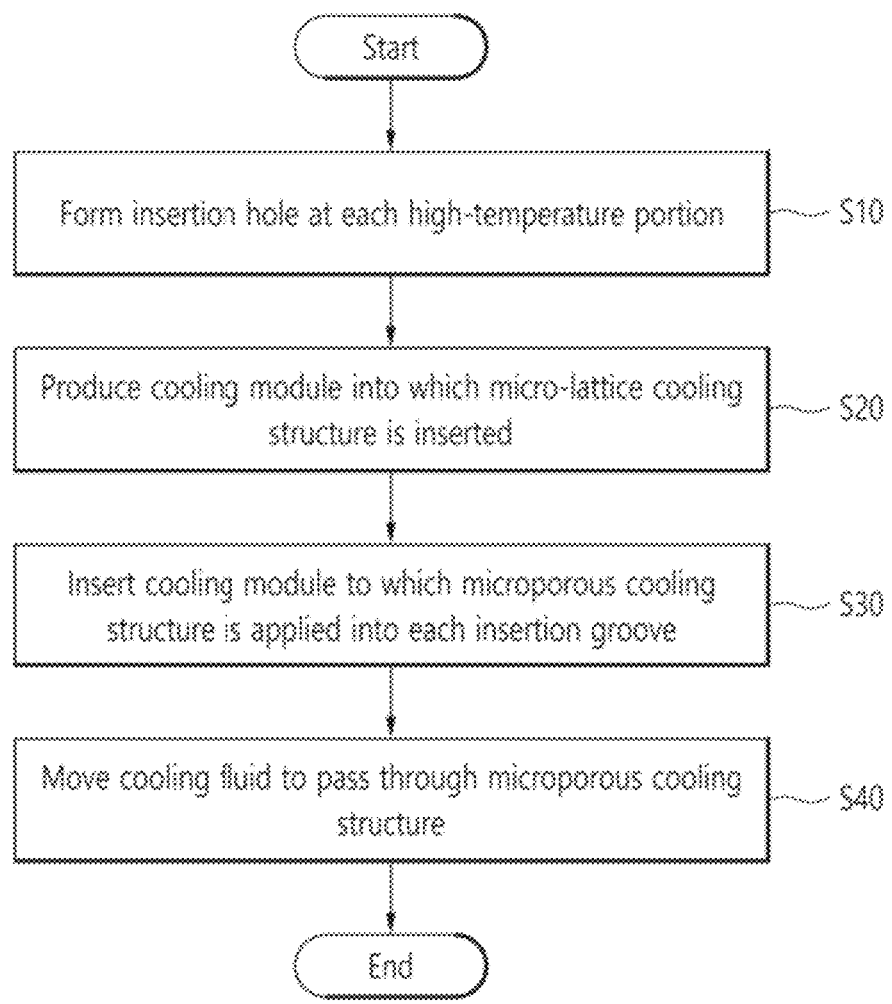
FIG. 12 is a flowchart illustrating a method of locally and conformally cooling a mold using a cooling module to which a microporous cooling structure according to an embodiment of the present disclosure is applied.

FIG. 12 is a flowchart illustrating a method of locally and conformally cooling a mold using a cooling module to which a microporous cooling structure according to an embodiment of the present disclosure is applied.

Referring to FIG. 12, the method of locally and conformally cooling a mold using the cooling module to which the microporous cooling structure is applied may include a) forming an engraved insertion groove (not shown), into which the cooling module 100 to which the microporous cooling structure 120 is applied is to be inserted, at each local location of the mold core 10 corresponding to the high-temperature portion of the mold (S10), b) producing the cooling module 100 into which a microporous cooling structure is inserted (S20), c) inserting the cooling module 100 into each insertion groove (S30), and d) cooling the high-temperature portion of the mold by circulating cooling fluid through the microporous cooling structure 120 (S40).

Here, the high-temperature portion of the mold may generally be a rib portion inside the molded product, but this is illustrative and not limitative, and the high-temperature portion may be different according to the product design.

Further, the mold core 10 and the cooling module 100 may be produced by the 3D printer and may be integrally provided because the mold core 10 and the cooling module 100 are produced by the 3D printer, but it is preferable that the mold core 10 and the cooling module 100 are separately produced to improve the maintainability and the cooling efficiency. Further, even in the case of the cooling module 100, the microporous cooling structure 120 may be produced integrally with the body part 110 or may be produced separately from the body part 110 and inserted into the body part 110.

When the mold is locally and conformally cooled using the cooling module 100 as described above, more effective cooling can be performed with low costs.

Since all other parts that are not described have been described in the description of the cooling module to which the microporous cooling structure is applied, a detailed description thereof will be omitted.

Hereinafter, the following experimental example is presented to examine the effect of the cooling module 100 according to the embodiment of the present disclosure in more detail, but the experimental example is merely illustrative of the present disclosure, and the contents of the present disclosure are not necessarily limited to the experimental example.

[Experimental Example] Verification of Cooling Performance of Microporous Cooling Structure

[Design of Microporous Cooling Structure]

In order to verify cooling performance of the microporous cooling structure, as in the embodiment of the present disclosure, the cooling module 100 includes the body part 110, the microporous cooling structure 120, and the cooling channel 130, wherein the body part 110 is separated from the mold core 10, the microporous cooling structure 120 is inserted into the structure insertion groove 111 of the body part 110, and the cooling channel 130 is configured so that the cooling fluid flows into the microporous cooling structure 120, and then passes through and is discharged from the microporous cooling structure 120.

Here, a D-surface TPMS structure, which has excellent heat exchange characteristics and structural rigidity due to a large surface area per unit volume, was used as the microporous cooling structure 120. In a state in which a volume fraction was set to 50% and the size of a cell was set to 10 mm and 20 mm, the microporous cooling structure 120 was produced using the 3D printer using aluminum alloy powder (AlSi-7 Mg) as a material and was then subjected to surface treatment using a micro-blasting apparatus and heat treatment using a vacuum heat treatment furnace.

[Study of Heat Transfer Characteristics of Microporous Cooling Structure]

In the present experiment, heat transfer characteristics according to the cooling structures of the cooling module (hereinafter, a "first example") to which the microporous cooling structure in which the size of the cell was 10 mm was applied, the cooling module (hereinafter, a "second example") to which the microporous cooling structure in which the size of the cell was 20 mm was applied, and the cooling module (hereinafter, a "comparative example) to which a shape-adaptive cooling channel according to the related art were compared.

Figure 13A:
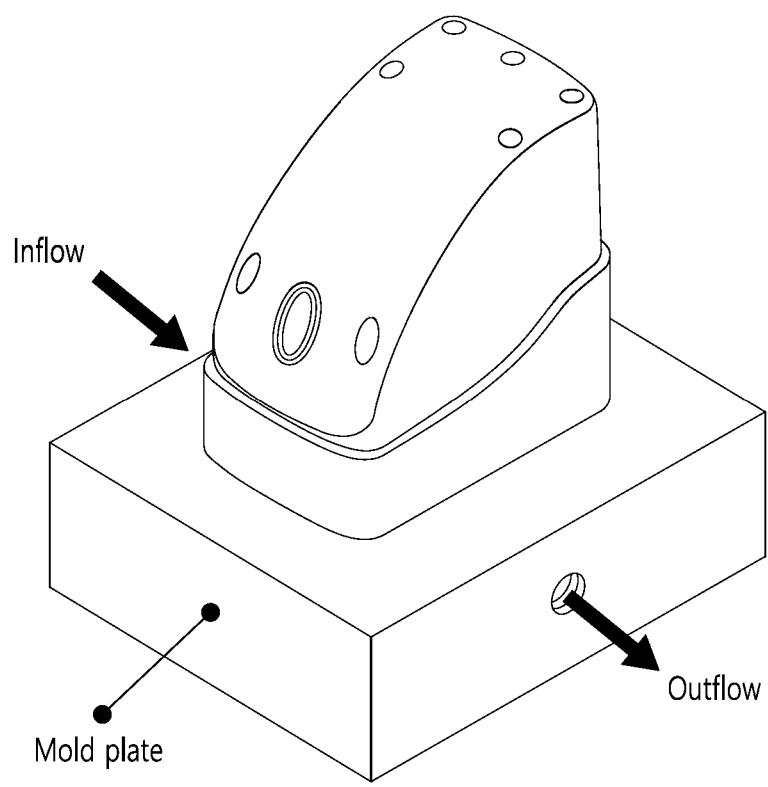
FIGS. 13A and 13B are views illustrating an experimental mold assembly produced to study the heat transfer characteristics of the microporous cooling structure.
Figure 13B:
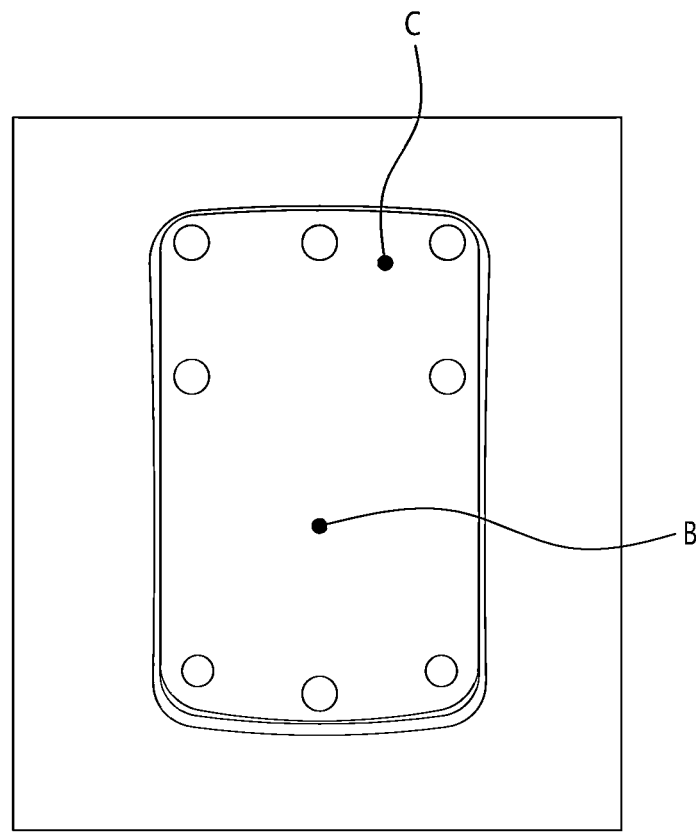

FIGS. 13A and 13B are views illustrating experimental mold assembly produced to study the heat transfer characteristics of the microporous cooling structure;

For the experiment, as illustrated in FIGS. 13A and 13B, the experimental mold assembly on which the mold cores to which the first and second examples and the comparative example are applied are to be mounted was produced, and while the temperature of a mold surface during a heating process through the experimental mold plates was captured with a thermal imaging camera, cooling water was supplied into the experimental mold plates and then discharged therefrom using a hot water supplying unit.

(Temperature Distribution)

The temperature distributions of the surfaces of the mold cores of the first and second examples and the comparative example were compared when 20 seconds elapsed after injection molding. The result is illustrated in FIG. 14.

Figure 14:
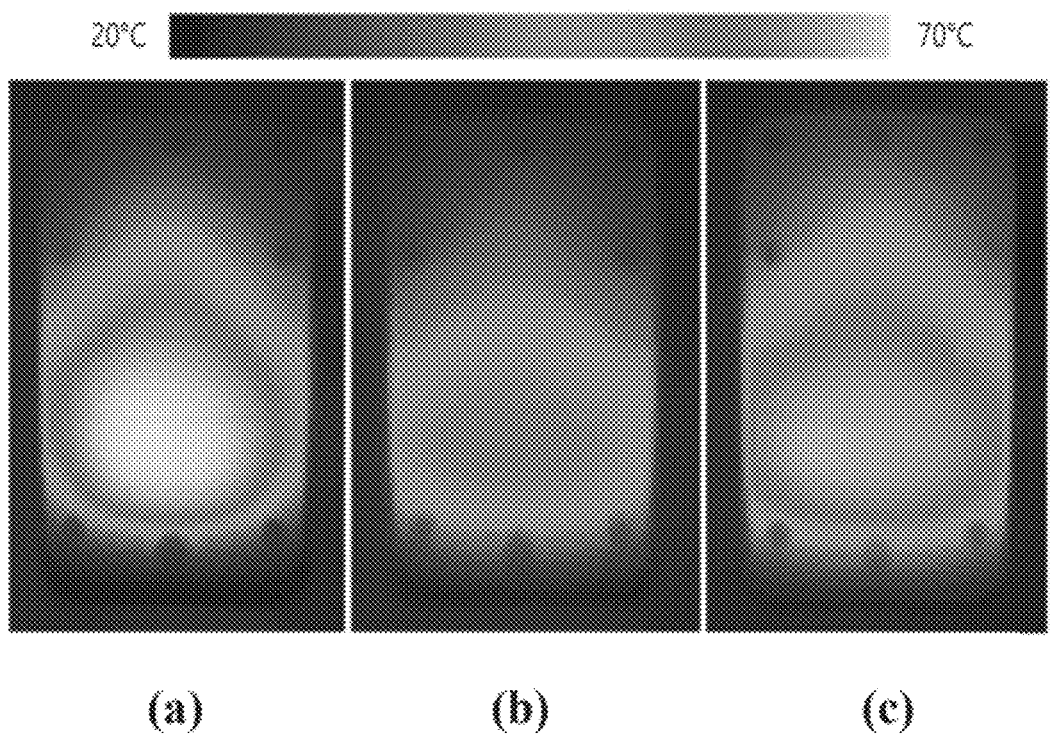
FIG. 14 is a view illustrating: (a) temperature distribution of a surface of a mold core according to a comparative example after 20 seconds has elapsed in a process of heating the mold assembly to study the heat transfer characteristics of the microporous cooling structure of FIG. 13, (b) temperature distribution of a surface of a mold core according to a first example, and (c) temperature distribution of a surface of a mold core according to a second example.

FIG. 14 is a view illustrating: (a) temperature distribution of a surface of a mold core according to a comparative example after 20 seconds has elapsed in a process of heating the mold assembly to study the heat transfer characteristics of the microporous cooling structure of FIG. 13, (b) temperature distribution of a surface of a mold core according to a first example, and (c) temperature distribution of a surface of a mold core according to a second example.

Referring to FIG. 14, with reference to point B of FIG. 13 at which a temperature rise was relatively high, in the comparative example, the temperature was highest at 68.2° C., and in the first example, the temperature was lowest at 55.5° C.

(Heating Rate and Uniformity)

In order to quantitatively study heating rates and uniformities of the first and second examples and the comparative example, the temperatures of points B and C illustrated in FIG. 13 were compared according to each time period.

Figure 15A:
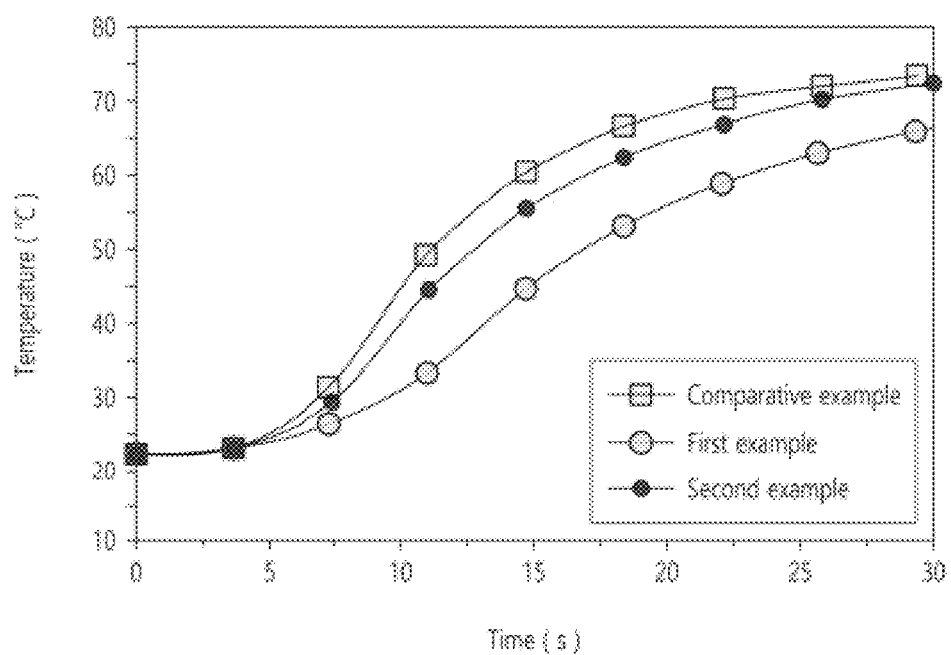
FIG. 15A is a graph illustrating a temperature change at point B according to the comparative example, the first example, and the second example in the experiment of FIG. 14.
Figure 15B:
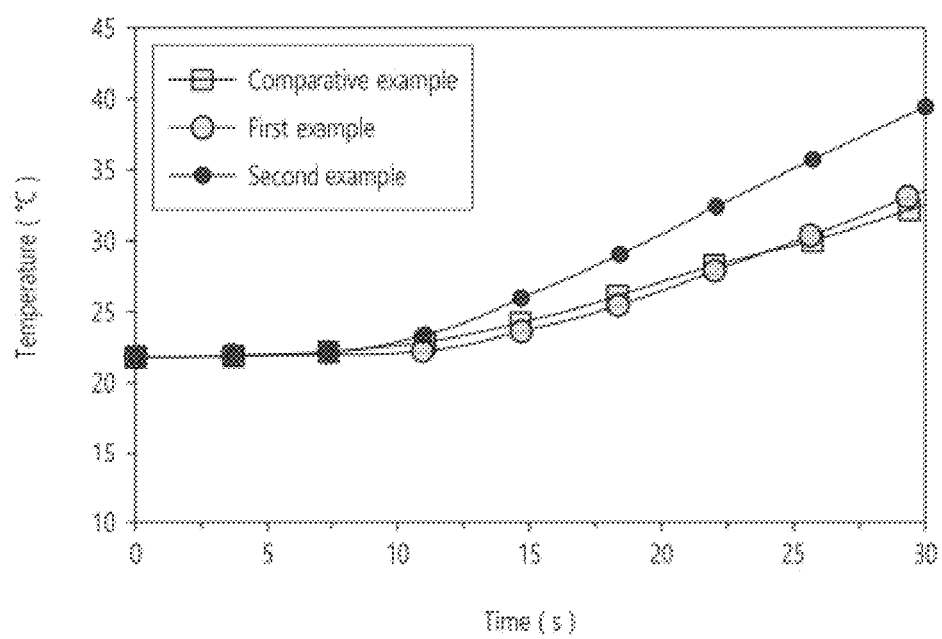
FIG. 15B is a graph illustrating a temperature change at point C.
Figure 15C:
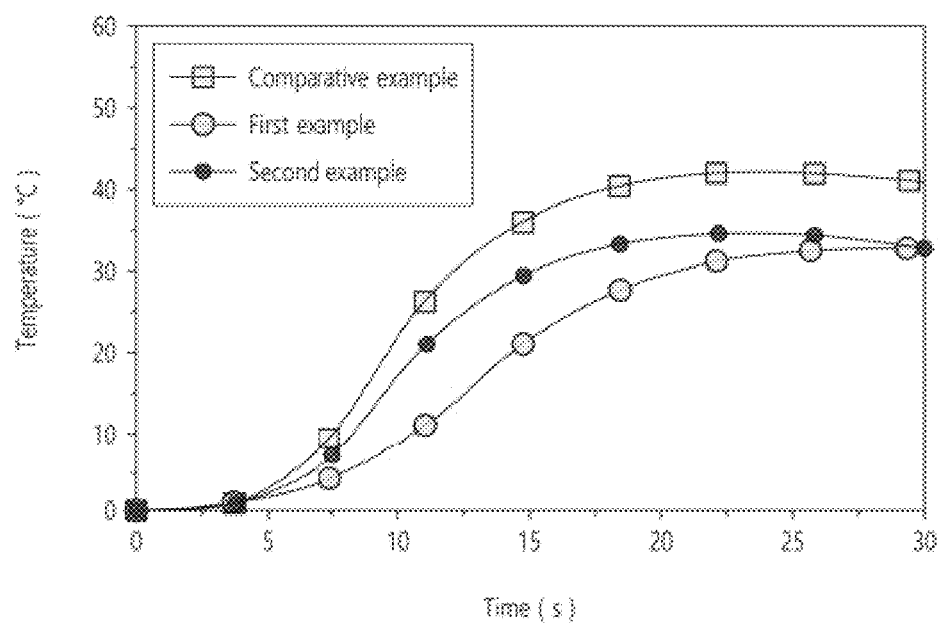
FIG. 15C is a graph illustrating a change in temperature difference between point B and point C.

FIG. 15A is a graph illustrating a temperature change at point B according to the comparative example, the first example, and the second example in the experiment of FIG. 14, FIG. 15B is a graph illustrating a temperature change at point C, and FIG. 15C is a graph illustrating a change in temperature difference between point B and point C.

First, referring to FIG. 15A, it may be identified that, at point B, in the comparative example, the heating rate was highest, and in the first example, the heating rate was lowest.

Further, referring to FIG. 15B, at point C, in the second example, the heating rate is highest, but in the first example and the comparative example, the heating rates are similar, and the heating rates had different tendency for each location.

Meanwhile, referring to FIG. 15C, it may be identified that a change in temperature difference ($\Delta T$) between the points B and C is highest in the comparative example and is lowest in the first example.

In comprehensive consideration of the above results, in the comparative example, the heating rate at a central portion B was high, but the heating rate at an outer portion C was low because heat was not well transferred, and as a result, the temperature uniformity was low.

On the other hand, it may be identified that, in the second example, the heating rate at the central portion B was high, the heating rate at the outer portion C was highest, and thus excellent temperature uniformity was achieved, and thus best characteristics in terms of cooling performance of injection molding is ultimately achieved.

[Injection Molding Experiment]

On the basis of the results, injection molding experiments were conducted by applying, to the mold core, the second example having the best characteristics and the comparative example for comparison, and in each case, in order to identify the quality of the molded product according to the cooling time, the experiments were conducted while the cooling time was changed from 5 seconds to 30 seconds in units of 5 seconds.

Figure 16:
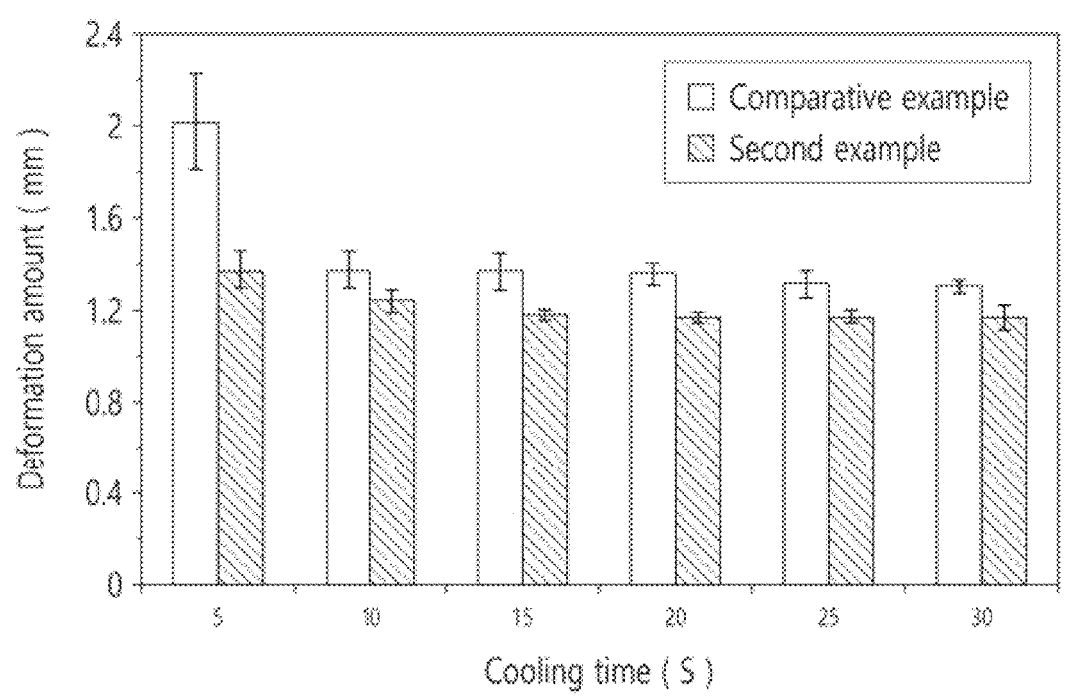
FIG. 16 is a comparison graph showing the amount of deformation of a molded product according to a cooling time in the injection molding experiment when the comparative example and the second example are applied.

FIG. 16 is a comparison graph showing the amount of deformation of a molded product according to a cooling time in the injection molding experiment when the comparative example and the second example are applied.

Referring to FIG. 16, in the case of the comparative example, when the cooling time is 5 seconds, the deformation amount was relatively high around 2 mm, but when the cooling time of 10 seconds or more is applied, the deformation amount was gradually decreased to a level of 1.3 mm to 1.1 mm.

On the other hand, it may be identified that, in the second example, even in the case of cooling for 5 seconds, the deformation amount was as low as 1.3 mm and was then gradually decreased as the cooling time increased.

From these results, it may be identified that, when the microporous cooling structure is used, the cooling rate and the temperature uniformity are improved compared to the mold core to which the shape-adaptive cooling channel according to the related art is applied.

The cooling module to which the microporous cooling structure is applied according to an embodiment of the present disclosure has a structure that is separated from a mold as demonstrated in the above experimental examples, and exhibits excellent cooling performance and maintainability compared to a conformal cooling channel integrated with the mold according to the related art by applying the microporous cooling structure.

Further, the cooling module to which the microporous cooling structure according to an embodiment of the present disclosure is applied can perform local and conformal cooling on a mold to reduce a production time and costs and effectively perform cooling as compared to an available cooling module.

Further, the cooling module to which the microporous cooling structure according to an embodiment of the present disclosure is applied is a conformal cooling structure that maintains a certain distance from the mold and has excellent cooling efficiency.

In addition, the above-described effects according to embodiments of the present disclosure are not limited to the described contents and may further include all effects that may be predicted from the specification and the accompanying drawings.

Hereinabove, embodiments of the present disclosure have been described with reference to the accompanying drawings. However, those skilled in the art to which the present disclosure pertains can understand that the present disclosure can be implemented in other specific forms without changing the technical spirit or essential features thereof. Thus, the embodiments described above are illustrative but not limiting in all aspects.

What is claimed is:

1. A cooling module configured to be installed at each high temperature region inside a mold core and move supplied cooling fluid thereinto to perform local and conformal cooling on a mold, the cooling module comprising:
    a body part inserted into the mold core;
    a microporous cooling structure inserted into an upper portion of the body part and having a plurality of connected hollow portions formed by periodically and repeatedly disposed micro unit cells; and
    a cooling channel including a conduit configured to pass the cooling fluid through the microporous cooling structure,
    wherein the upper portion of the body part is recessed inward to form an insertion groove, the upper portion of the body part being opposite to a molded product with the mold core interposed therebetween, and the body part accommodates the inserted microporous cooling structure,
    wherein the body part, when inserted into the mold core, is fixed to a fixing portion disposed on a lower side of the body part, the lower side of the body part being exposed to an outside,
    wherein the microporous cooling structure has a lattice structure or a triply periodic minimal surface (TPMS) structure,
    wherein a cooling rate is adjustable by changing a volume fraction of the plurality of connected hollow portions of the microporous cooling structure,
    wherein the adjusting by changing the volume fraction of the plurality of connected hollow portions of the microporous cooling structure is performed by adjusting the cooling rate by adjusting an amount of the cooling fluid flowing along the hollow portions,
    wherein the volume fraction of the plurality of the connected hollow portions of the microporous cooling structure is changed through a change in a size of the micro unit cell or a change in a design variable of the micro unit cell, and
    wherein, when the micro unit cell has the lattice structure, the design variable of the micro unit cell is set as a change of a diameter of a cylindrical part in the lattice structure, and when the micro unit cell has a curved surface in the TMPS structure, the design variable of the micro unit cell is set as a change of a thickness of the TPMS structure.

2. The cooling module of claim 1, wherein the microporous cooling structure is separable from the mold core through the body part.

3. The cooling module of claim 1, wherein the body part and the microporous cooling structure form a curved surface, and the curved surface maintains a certain distance from a surface of the mold core facing the molded product, to perform the local and conformal cooling.

4. The cooling module of claim 1, wherein the microporous cooling structure is produced by three-dimensional (3D) printing.

5. The cooling module of claim 1, further comprising an ejector pin insertion hole that allows an ejector pin to be inserted thereinto, wherein the ejector pin insertion hole prevents interference between the ejector pin and the cooling module when the ejector pin is provided inside the mold.

6. The cooling module of claim 1, further comprising a sealing member interposed between the body part and the mold core and preventing a leakage of the cooling fluid.

7. A method of locally and conformally cooling a mold using the cooling module according to claim 1, the method comprising: forming an engraved insertion groove, into which the cooling module is to be inserted, at a location of the mold core corresponding to a high-temperature portion of the mold; producing the cooling module into which the microporous cooling structure is inserted; inserting the cooling module into the engraved insertion groove; and cooling the high-temperature portion of the mold by flowing the cooling fluid through the microporous cooling structure.

* * * * *